United States Patent Office 3,769,421
Patented Oct. 30, 1973

3,769,421
INJECTABLE 3α-HYDROXY-PREGNANE-11,20-
DIONE ANESTHETIC COMPOSITIONS
Guy Bernard Pitel, Courbevoie, France, assignor to Societe d'Etudes Scientifiques et Industrielles de l'Ile-de-France, Paris, France
No Drawing. Continuation-in-part of abandoned application Ser. No. 725,948, May 1, 1968. This application Dec. 7, 1970, Ser. No. 95,980
Claims priority, application France, May 3, 1967, 105,231
Int. Cl. A61k 17/00, 27/00
U.S. Cl. 424—243                    2 Claims

ABSTRACT OF THE DISCLOSURE

The sterilized compositions of this invention utilize predione (3α - hydroxy-pregnane-11,20-dione). Although predione per se is substantially insoluble in water, the compositions of this invention are miscible in all proportions with water. Such compositions may be administered to mammals intravenously, subcutaneously, by slow or rapid injection or by perfusion as a quick-acting highly effective and non-toxic anesthetic either alone or in conjunction with other anesthetics or pharmaceutical compositions.

---

This application is a continuation-in-part of the patent application Ser. No. 725,948, filed May 1, 1968, now abandoned.

The present invention relates to an injectable medicament useful as a general quick-acting anesthetic of which the active principle is 3α-hydroxy-pregnane-11,20-dione of the general formula:

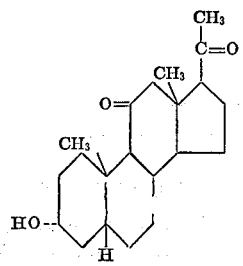

This compound hereafter called predione was described by Reichstein in 1944 (Helv. Chim. Acta., 1944, 27, 821–29) and can be prepared according to the procedure described by Nes and Mason (J. Am. Chem. Soc. 1951, 73, 4755–6). The predione may be prepared as follows:

3 g. of 3α-hydroxy-21-acetoxy-11,20-dioxo-12α-bromo-Δ¹¹-pregnene are agitated at ambient temperatures with a dilute acetic acid solution containing zinc powder in suspension. The mixture is filtered, the solid is washed with methanol added to the filtrate. The whole filtrate and methanol solution is evaporated to dryness under vacuum. The residue recovered with water yields 1.9 g. of 3α-hydroxy-11,20-dioxo-Δ¹⁶-pregnene (M.P. 220–222° C.).

500 mg. of this latter product dissolved in 10 ml. of methanol is hydrogenated on platinum at ordinary temperature. The mixture is filtered and the filtrate concentrated under vacuum yields 220 mg. of 3α-hydroxy-11,20-dioxo-pregnane (M.P. 175–177° C., $[\alpha]_D^{24}=114°$ in chloroform). This latter compound is converted to predione.

Predione, like certain other steroid compositions, possesses marked general anesthetic activity, is quick-acting and has no observable side effects. Nevertheless, predione is not utilizable therapeutically because of its insolubility in water.

In accordance with this invention, predione is incorporated in sterilized anesthetic compositions which are adapted for administration by intravenous injection or perfusion. The compositions comprise a limpid, stable, aqueous solution miscible in all proportions with water. The compositions of this invention comprise predione, a non-toxic solvent, a non-toxic solubilizing or wetting agent and water. The proportion of the components of the compositions of this invention per 50 mg. of predione are 1–5 ml. of solubilizing agent, 1–5 ml. of solvent and ½–5 ml. of water. After formulation, the compositions are sterilized, preferably in a suitable container, such as an ampule, at a temperature of 100–140° C. Examples of the solubilizing agents are polyethylene derivatives of fatty acid partial esters of hexatol anhydrides, sold under the name Tween, such as sorbitan oleate; nonionic emulsifying agents and dispersants sold under the name Emulphor, such as polyoxyethylated vegetable oils, alcohols and fatty acids; and alkyl-aryl polyether alcohols sold under the name Triton, such as tyloxypal, sold as Triton A–20. Examples of the solvents are isopropyl ether of triethyleneglycol (E.I.T.G.), dimethyl nicotinamide (D.M.N.), the isopropyl ether of polyethyleneglycol (E.I.P.G.), glycofurol, and 2,2-dimethyl-4-hydroxymethyl-1,3-dioxolane sold under the name Solketal.

The compositions of this invention are particularly adapted to the administration intravenously or by perfusion to a mammal, such as a domesticated animal, such as a dog or a cat. Advantageously, the concentration may be 1 to 10 mg. of predione per kg. of body weight of the mammal. The administration of the anesthetic by perfusion is particularly desirable during an operation on a mammal where it may be administered drop by drop alone or added to some other medication such as phenothiazines in physiological serums or glucose.

A more comprehensive understanding of this invention is obtained by reference to the following examples.

EXAMPLE I

Ampules are prepared containing the following composition:

To 20 mg. of Triton A–20 are added 50 mg. of predione. This mixture is brought to 2 ml. by dimethyl nicotinamide. There are then added 4 ml. of water. The ampules are then sealed and the contents sterilized by subjecting the ampules to a temperature of 120° C. for ½ hour. Definite stabilization is observed for the solution contained in the ampules.

In a similar manner an ampule was identically prepared and sealed. However, the second ampule was heated for one hour at 70° C. In contrast to the ampules prepared and sterilized at 120° C., which had definite stabilization, the composition contained in the ampule heated to 70° C. precipitated in less than an hour. Accordingly, it is essential that the compositions of this invention be sterilized at a temperature of the order of over 100° C.

EXAMPLE II

Ampules containing the following composition are prepared:

To 20 mg. of Triton A–20 dissolved in 1 ml. of D.M.N. and 2 ml. of E.I.T.G. are added 50 mg. of predione. The mixture is diluted with 5 ml. of water. The ampules filled with the composition are then sterilized for ½ hour at 120° C. The tests showed a definite miscibility with water.

In the preparation of the compositions of this invention it is necessary that the compositions include water and that water be added before the sterilization of the ampules. For example, compositions containing a simple solution of predione and a solvent which does not include water cannot be used in perfusion. As an illustration, if predione is dissolved by the addition of isopropyl ether of triethyleneglycol to obtain a 2 ml. solution, the solution would be entirely unsatisfactory for injection intranvenously or for administration by perfusion.

EXAMPLE III

The following components are combined in an ampule:

Predione: 50 mg.
Solketal: 2.5 ml.
Tween 60: 2 ml.
Distilled water: 0.5 ml.

It is sterilized for 30 minutes at 120° C. After sterilization, the content of the ampule is completely soluble in water.

EXAMPLE IV

The following components are combined in an ampule:

Predione: 25 mg.
Emulphor: 1 ml.
Solketal: 1.25 ml.
Distilled water: 0.25 ml.

It is sterilized for 30 minutes at 120° C. After sterilization, the content of the ampule is completely soluble in water.

The following tests with rabbits showed good tolerance of the compositions of the invention.

(1) Predione—E.I.T.G.

Predione was injected intravenously in a solution with E.I.T.G. in concentration of 10 mg./ml. The dose administered was 5 mg./kg. of rabbit. This solution was injected in the marginal vein of the right ear of three rabbits and the same quantity of pure solvent without predione was injected in the left ear. The first rabbit was sacrificed the second day after injection, the second rabbit on the fourth day, and the third rabbit on the sixth day. A fragment of ear taken 2 cm. below the point of injection was fixed in a solution of 10% formol.

Macroscopic results

First day:

First and second rabbit: no local reaction
Third rabbit: slight edema of both ears Second day:

First and second rabbit: ear normal, but course of the vein of the right ear more apparent
Third rabbit: slight increase of edema; course of the vein of the right ear more apparent Fourth day:
Second rabbit: normal ear, course of the vein of the right ear more marked
Third rabbit: condition unchanged Sixth day:

Third rabbit: regression of edema; course of the vein of the right ear still more marked.

A solution of predione in isopropyl ether of triethylene glycol was administered intravenously in concentrations of 1 mg./kg.—5 mg./kg.—10 mg./kg.

In all cases the quantity of isopropyl ether of triethylene glycol injected was 0.50 ml./kg. The results of this testing appear in the following table.

| Dose | Time | Observations |
| --- | --- | --- |
| 1 mg./kg. | t=0 | On injection, hypnosis, loss of righting reflex, no loss of reflex of eyelids. |
|  | t=4m | Return of righting reflex. |
|  | t=5m | Return to normal condition. |
| 5 mg./kg. | t=0 | Respiration very slow, loss of righting reflex. |
|  | t=5m | Acceleration of respiration. |
|  | t=13m | Return of righting reflex. At no time was there loss of reflex of eyelids. |
|  | t=18m | Loss again of righting reflex. |
|  | t=20m | Return of righting reflex, but staggering walk. |
|  | t=29m | Return to normal condition. |
| 10 mg./kg. | t=0 | Hypnosis, loss of righting reflex, loss of reflex of eyelids. |
|  | t=3m 30 | Return of reflex of eyelids. |
|  | t=35m | Calm and regular respiration. |
|  | t=40m | Return of righting reflex and return to normal condition. |

(2) Predione—Tween 60—E.I.T.G.

Identical tests on rabbits were made with solutions containing the mixture of:

Predione: 0.010 g.
Tween 60: 0.35 g.
E.I.T.G.: 1 ml.

The dose injected was 0.5 mg./kg.

Macroscopic observations of the ear during the week following the injection:

After the first day: Ear normal; nervous condition
After two days: Ear slightly swollen the length of the vein; nervous condition
After three days: Condition stationary
After six days: Ear normal; condition generally normal
After seven days: Vein red; thrombosis at the point of injection; general condition normal The following table shows the results of the testing on rabbits after injection of the solution:

| Dose | Time | Observations |
| --- | --- | --- |
| 0.5 ml./kg. | t=0 | On injection, hypnosis, loss of righting reflex, no loss of eyelid reflex. |
|  | t=10m | Slight trembling. |
|  | t=15m | Contractions. |
|  | t=16m | Return of righting reflex, then loss again of righting reflex. |
|  | t=19m | Return of righting reflex; staggering walk. |
|  | t=35m | Return to normal condition. |

(3) Predione—D.M.N.—Water—Triton

Tests on rabbits were made on solutions containing:

Predione: 0.66 g.
Dimethylnicotinamide: 33 ml.
Triton: 0.25 g.
Distilled water: 100 ml.
Dose injected: 0.75 ml./kg.

Macroscopic results

First day:
First rabbit: ear treated, very slight edema; second ear, very slight edema
Second rabbit: ear treated, slight edema; second ear, slight edema
Third rabbit: ear treated, slight edema; second ear, slight edema Second day:
First rabbit: ear treated, very slight edema; second ear, very slight edema
Second rabbit: ear treated, normal; second ear, beginning of necrosis
Third rabbit: ear treated, slight edema; second ear, normal Fourth day:
First rabbit: ear treated, very slight edema; second ear, very slight edema Second rabbit: ear treated, normal; second ear, condition unchanged Third rabbit: ear treated, slight edema, second ear, normal Fifth day:

First rabbit: ear treated, very slight edema; second ear, very slight edema

Second rabbit: ear treated, normal; second ear, condition unchanged

Third rabbit: ear treated, slight edema; second ear, normal

Sixth day:

First rabbit: ear treated, very slight edema; second ear, very slight edema

Second rabbit: ear treated, normal; second ear, condition unchanged

Third rabbit: ear treated, slight edema; second ear, normal

The following table shows the results of the testing on rabbits after injection of the solution:

| Time | Observations |
|---|---|
| t=0 | On injection, hypnosis, loss of righting reflex, respiration slow. |
| t=18m 30 | Return of righting reflex but staggering walk. At no time was there any loss of eyelid reflex. |

Pharmacological results were confirmed in clinical studies. The clinical studies were as follows:

(1) 100 mg. of predione were injected intravenously in a 23-year-old woman who had to undergo an appendectomy. There was observed almost immediate deep sleep with persistence of the corneal reflex. The anesthetic had been followed up with Fluothane (bromochlorotrifluoroethane), oxygen in open circuit. The pulse and blood pressure were not changed by the injection of the anesthetic product remaining 80 and 13/8.

(2) 75 mg. of predione was injected intravenously in a young man 18 years old before undergoing the removal of an abscess on the buttock. Very rapid onset of superficial sleep with conservation of corneal reflex was observed. Ten minutes after injection of the anesthetic and five minutes after the end of the operation, the patient was completely awake and conscious. He had no memory of the operation. A very slight increase of blood was observed which went from 12/7 to 13/8, but no notable acceleration of pulse was found.

(3) 75 mg. of predione was injected at one time into a young woman 28 years old before undergoing the removal of a polyp from the neck of the uterus. There was almost immediately onset of sleep of average depth. Disappearance of the corneal reflex was observed but preservation of the luminous reflexes. At the end of the operation, six minutes after the injection of the anesthetic product, the patient commenced to show signs of awaking, ten minutes after the injection the patient was completely awake, conscious but no memory of the operation. No change in pulse or blood pressure was observed.

The three patients were examined 48 hours after operation and showed no sign of venous irritation.

The injectable solutions of predione of this invention possess excellent anesthetic properties, are devoid of hormonal activity, strongly potentiate other general anesthetics such as barbiturates, nitrogen protoxide and ether. The new compositions of this invention can be used in surgical or obstretrical anesthesia, in bronchoscopy, in neuropsychiatry and in cardiology. The compositions may be administered intravenously, by slow or rapid injection, subcutaneously or perfusion of a solution of predione in a physiological serum.

What is claimed is:

1. A sterilized anesthetic composition adapted for administration by intravenous injection or perfusion comprising a limpid, stable, aqueous solution miscible in all proportions with water, comprising predione, dimethylnicotinamide, tyloxypal and water in the proportion of 20 mg. of tyloxypal, 2 ml. of dimethylnicotinamide, 5 ml. of water and 50 mg. of predione, said composition after formulation being sterilized by heating for a period of ½ hour at a temperature of 120° C.

2. The method of anesthetizing a mammal which comprises administering by intravenous injection or perfusion to said mammal an effective amount of the composition of claim 1.

References Cited
FOREIGN PATENTS 91,070   5/1959   Netherlands _____ 424—243

OTHER REFERENCES

McCutcheon: Detergents and Emulsifiers, 1967, p. 100.
Chemical Abstracts, vol. 65 (1966), p. 10423g.
Chemical Abstracts, vol. 42 (1948), p. 1677f.
Chemical Abstracts, vol. 58 (1963), p. 4388f.

SAM ROSEN, Primary Examiner

V. D. TURNER, Assistant Examiner